Patented June 3, 1930

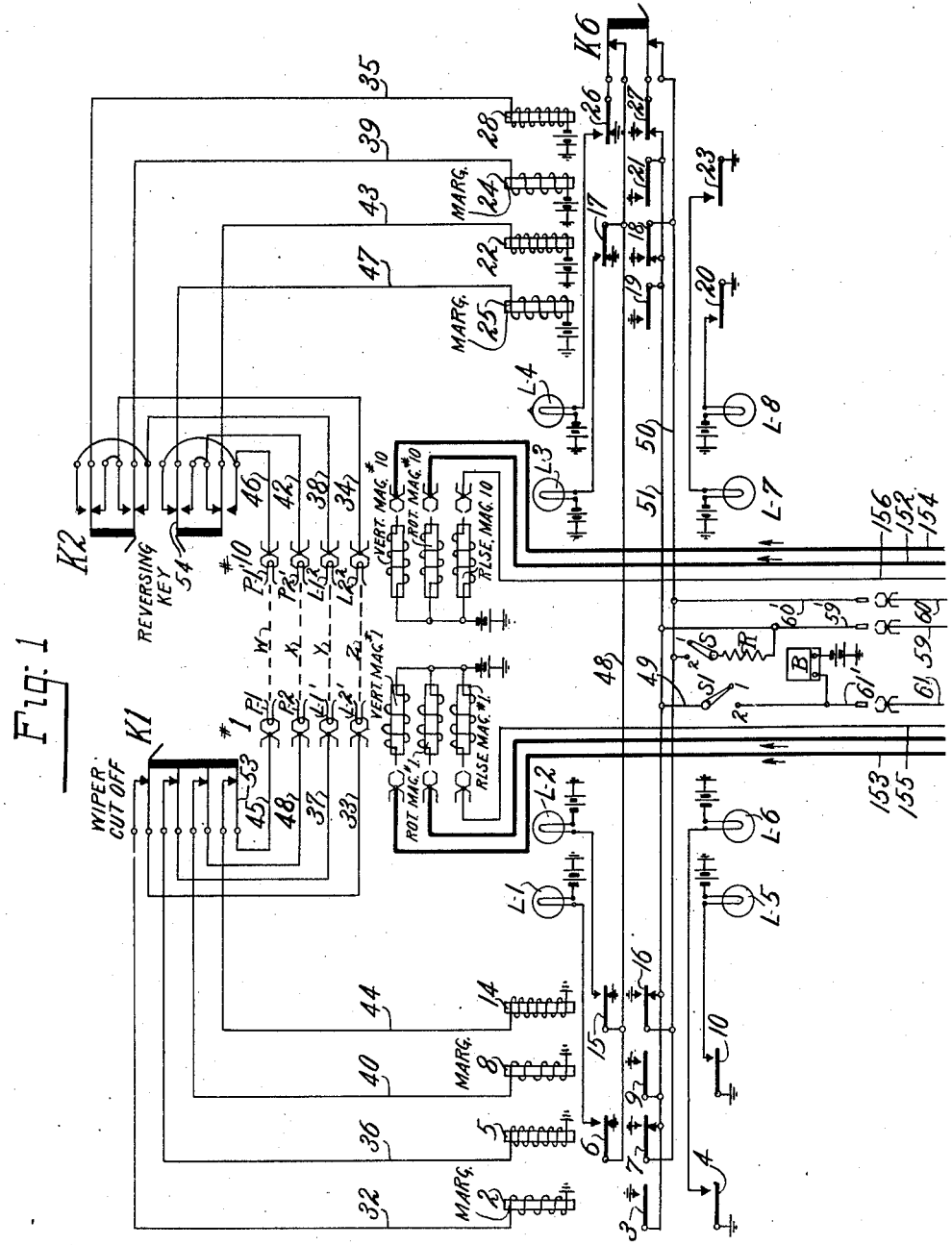

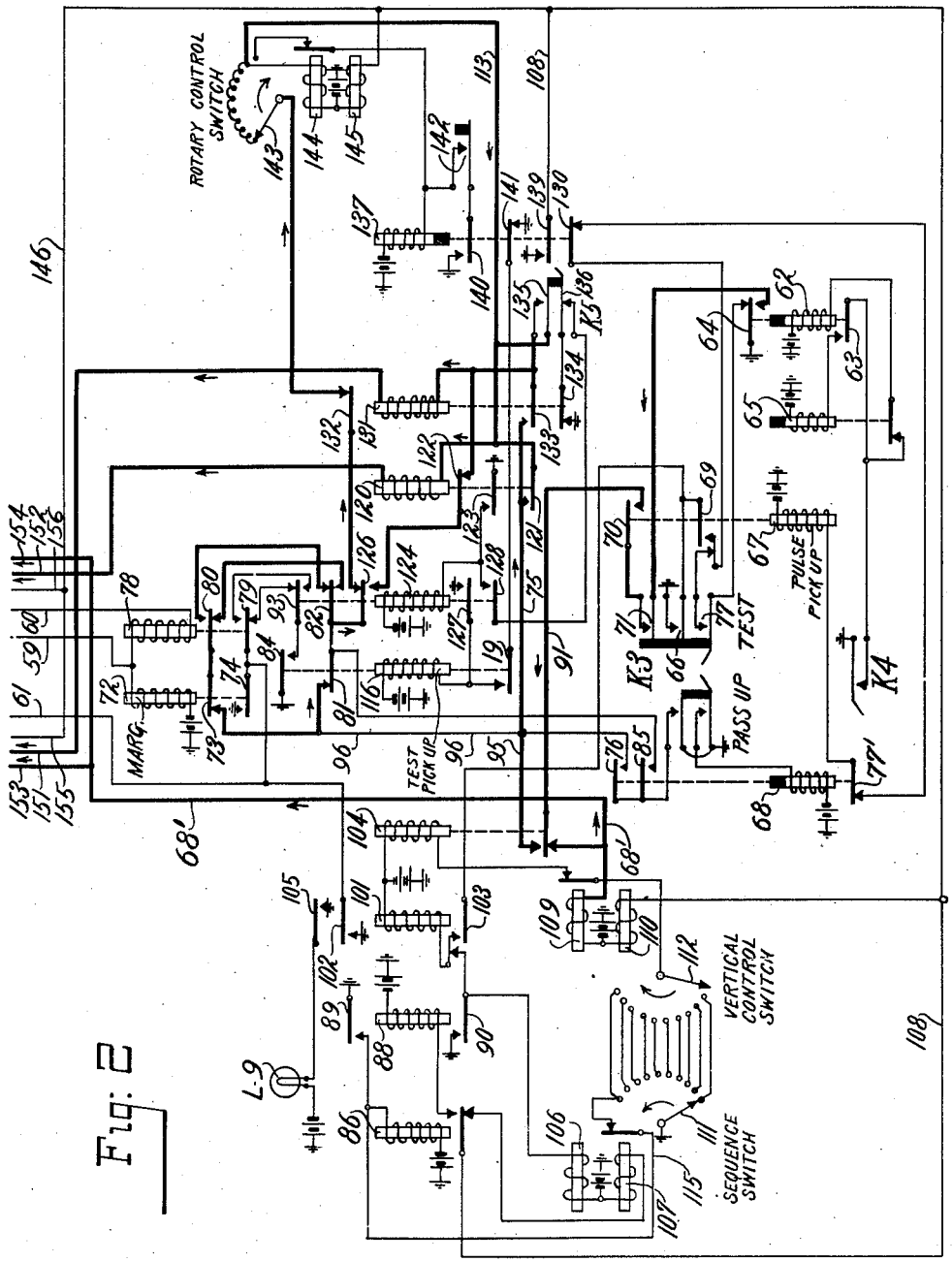

1,761,251

UNITED STATES PATENT OFFICE

JOHN I. BELLAMY, OF BROOKFIELD, AND RODNEY G. RICHARDSON, OF CHICAGO, ILLINOIS, ASSIGNORS TO AUTOMATIC ELECTRIC INC., OF CHICAGO, ILLINOIS, A CORPORATION OF DELAWARE

TESTING EQUIPMENT

Application filed July 22, 1926, Serial No. 124,129. Renewed October 21, 1929.

The present invention relates in general to testing equipment, but is particularly concerned with the provision of appropriate equipment for making various tests on bank multiples extending between the bank contacts of Strowger automatic switches, although not being particularly limited to use in connection with this type of switch.

One object of the invention is to provide equipment of the foregoing character which will test the multiples for various possible defects and give visual indications of the multiple or multiples in trouble, as well as the character of trouble encountered.

Another object is to provide equipment which may be conveniently associated with pairs of the automatic switches having access to the multiples to be tested so that they may be automatically controlled to connect the testing equipment with the various multiples as fast as the testing equipment can test them.

The foregoing results are accomplished by the various circuits and apparatus illustrated in the drawings, in which—

Fig. 1 diagrammatically illustrates the equipment for making the various tests associated with the wipers of what are assumed to be the first and last of a group of ten switches having access to a group of trunk multiples which are to be tested.

Fig. 2 diagramatically illustrates that part of the equipment used to cause the Strowger switches, illustrated in Fig. 1, to be advanced from multiple to multiple as the test proceeds.

The automatic switches shown in Fig. 2 are of the well known pawl and ratchet type equipped with springs for restoring them, effective upon operation of their associated release magnets.

In ordinary practice the test equipment of Fig. 1 will be used in conjunction with the equipment of Fig. 2 by a routine testing operator having very little knowledge of the steps required to cure a case of trouble. This attendant connects up the test equipment and starts it to operate. When it encounters a case of trouble it automatically stops and the attendant simply makes a record of the number of the trunk engaged and of the particular trouble lamps lighted. The attendant then restarts the testing equipment by operating an appropriate start key.

Following the foregoing tests an experienced trouble man takes the record, made by the routine testing operator, and the equipment of Fig. 1 only, manually positions the switches on the multiples in trouble and against tests them and proceeds to clear them. The equipment of Fig. 1 is of course complete in itself and in small exchanges may be used to test all multiples. As a matter of convenience a detailed description will first be given of the test equipment of Fig. 1 when used independent of Fig. 2.

It is assumed in the present instance that there are ten switches having access to the trunk multiples under test and that the switches shown are the first and last or #1 and #10 of the group. The wipers P1, P2, L1' and L2' of switch #1, and the wipers P1', P2', L1², and L2², of switch #10 are for convenience of tracing the circuits shown in connection with a set of trunk multiples.

Before conducting any test the attendant should see to it that the frames of switches #1 and #10, as well as the remaining of the switches having access to the group, are grounded so that any multiples which are grounded to the frame will be detected during the testing operation.

The attendant starts the testing operation by first positioning the switch #10 into connection with its first set of contacts. In the present case, since it is assumed that Strowger type switches are used, this will mean that the attendant will elevate the wipers of the switch #10 one step and then rotate them in one step. With only the switch #10 in this position, the presence of ground on any of the multiples W, X, Y, or Z will be effective to operate the associated relays 25, 22, 24 or 28. For instance, if the multiple W is grounded a circuit will be completed through wiper P1', conductor 46, spring 54, of the key K2 and its resting contact, conductor 47, to the winding of marginal relay 25 and battery. This relay upon operating at its armature 20 completes a circuit for lamp L8, and at its armature 19 also applies ground to conductor 61' by way of conductors 51, and 49, and switch S1 (in position 2). This ground operates buzzer B to warn the attendant of trouble.

Should ground potential be present on multiple X, relay 22 will operate, at its armature 17 completing a circuit for lighting lamp L3, from ground supplied over conductor 48. This relay at its armature 18 completes the circuit of buzzer B, as in the previous case, but over a slightly different path, extending from grounded front contact and armature 18, conductor 50, thru an armature and back contact of any nonoperated nonmarginal relay, armature 7 for instance, to conductor 51. From this point the circuit is as previously described. Relays 28 and 24 function, when multiples Y and Z are grounded, in substantially the same manner as relays 22 and 25 and therefore their circuits will not be traced.

The attendant now proceeds with the test by positioning the #1 switch into connection with its first set of contacts, or in other words, the multiple with which switch #10 has been connected. This is the position in which the switches are shown in Fig. 1. The relay 2 is now connected in series with the multiple Z and with relay 28. This circuit may be traced from ground, winding of relay 2, conductor 32, upper springs of key K1, conductor 33, wiper L2', multiple Z, wiper L2², conductor 34, upper break springs of key K2, the conductor 35 and the winding of relay 28 to battery. Relay 5, multiple Y, and relay 24 are connected in a similar circuit, as are also relays 8 and 14 multiples X and W and relays 22 and 25.

As relays 2, 8, 25, and 24 are marginal they do not operate when connected up in series with high wound relays such as 5, 14, 22 and 28. If all conductors W—Z are closed, all these latter relays operate, and at their respective armatures 6, 15, 17, and 26 close points in circuits for lighting lamps L1—L4. It will be noted however, that the conductor 48 now has no ground potential thereon and, therefore, the lamps are not lighted.

A circuit is now completed for the buzzer B, from grounded front contact and armature 16 of relay 14, for instance, through conductor 50 switch S (position 2) resistance R, conductor 51, and contacts of switch S'. This buzzer, when operated through the resistance R, gives out a subdued tone to inform the attendant that the multiples test O. K.

We will assume now that the multiple W is "open" and that the relay 14 therefore fails to operate. Consequently, ground is maintained on conductor 48 by the armature 15 of relay 14, and lamps L1, L3 and L4 will light to give an indication of the trouble encountered. The buzzer B will also be operated as before but over a circuit independent of resistance R, and therefore with increased volume to warn the attendant that a case of trouble has been encountered. Similar to this, if Z is the multiple which is "open" its associated relay 28 will fail to operate and lamp L4 will be the one which will fail to light. If all of the multiples should be open none of the lamps will light, and no ground potential will be applied to conductor 50 and therefore the buzzer B will not operate at all, which will indicate to the attendant that all of the multiples are open.

We will now assume that multiples W and X are reversed or that a short circuit exists between them. If the case referred to is simply a reversal of connections, relay 14 will be connected in series with relay 22 instead of 25, and relay 8 will be connected in series with relay 25 instead of with relay 22. Under this condition all four of these relays will operate. Likewise, if there is a short circuit or common electrical connection between multiples W and X relays 8 and 14 will be tied together, 22 and 25 will be tied together and there will be a common connection between the two pairs and all these relays will operate. In either of the foregoing cases all of the testing relays are operated except marginal relays 2 and 24. Since all of the non-marginal relays are operated, ground is removed from conductor 48 and none of the lamps L1—L4 will light. The marginal relays 8 and 25 however, will at their respective armatures 10 and 20 cause circuits to be closed for lamps L5 and L8, and they close a direct circuit for the buzzer at armatures 9 and 19. The loud note of the buzzer informs the attendant that trouble exists. The attendant may now operate the reversing key K2 downward to reverse the connections to multiples W and X. If this causes the set to give an O. K. indication, the attendant will know that there is a reversal. On the other hand, if the buzzer and lamps still indicate trouble, this will signify that a short circuit exists between the multiples W and X.

We will now assume that, in addition to the short circuit between W and X, W is open at a point to the right of the short circuit. Under this condition relays 8 and 14 will be connected together, in series with multiple X and relay 22, and relays 5, 14, 22 and 28 will operate. If the multiple W is open at a point to the left instead of the right of the point of short circuiting relays 22 and 25 will be connected together in series with relay 8 and all three of these relays operate, and relays 5, and 28 also will be operated.

The attendant after completing the test on this multiple proceeds with the test by positioning the wipers of switch #10 into engagement with the second set of contacts in the first level by rotating the switch #10 one step.

If now, there happens to be a battery potential present upon any of the multiples, W, X, Y, or Z the corresponding or associated relays 14, 8, 5, or 2 will operate. If the wiper P1 picks up battery, the associated relay 14 operates to light its associated lamp L2 to give the attendant visual indication of the multiple in trouble. The relay 14 also at its armature 16, being operated this time independent of the remaining non-marginal relays, completes a circuit from ground, working contact and armature 16 through armature 7 and its resting contact, or the corresponding armature of any other non-operated non-marginal relay, conductor 51, switch S' and the buzzer B to battery. As previously stated, in each test where trouble is encountered a circuit for the buzzer B which excludes the resistance R, is completed and the buzzer buzzes loudly giving the attendant a distinctive warning.

Since at this time switch #1 is on one trunk multiple and the switch #10 is on another any common connections between the two multiples will cause a circuit to be completed for one or more of the test relays to advise the attendant of this condition.

The attendant continues the test by positioning the switches #1 and #10 from multiple to multiple until all multiples in the first level have been tested. The remaining levels are tested in the same way.

By testing with the first and last switch (#1 and #10) of a group the "opens", due to actual breaks in the conductors or to conductors being placed wrongly on the first or last contact bank will be located; "short circuits" due to solder or bare wire contact between multiples of any bank; and all "local reverses", reverses between multiples due to wrong wiring in either the first or last contact bank will be located. For a complete test these troubles are first taken care of and the test is repeated to insure that no other abnormal condition has been caused by the repairman. Then tests are made as before, but with switches #2 and #9, then #3 and #8, etc. In these latter tests all trouble such as "opens", usually due to wrong wiring, between the adjacent switch banks will be located.

While the description only takes into consideration certain types of trouble it will be apparent to those skilled in the art that the test equipment is capable of detecting a very large variety of irregular conditions.

It may be advisable, before considering the control the testing equipment exercises over the equipment of Fig. 2, to explain how the equipment of Fig. 2 functions assuming that no trouble is encountered, and this will be done.

The attendant connects the equipment of Fig. 1, with the equipment of Fig. 2 through the medium of the clips in which conductors 151—156, and 59—61 terminate, and places the switch arms S and S1 into position 1, operates the key K3 to the right to test position and starts the impulsing device comprising relays 62 and 65 by operating the interrupter start key K4. It makes no difference particularly which of these keys is operated first, but the key K4 has been provided so that the relays 62 and 65, which determine the speed at which impulses are sent out, may be adjusted or tested out without the necessity of operating the remainder of the associated equipment.

We may assume, for the purpose of illustration, that the key K4 is operated first, thereby completing a circuit for slow acting relay 62. This relay at its armature 64 connects ground to its front contact, and at its armature 63 completes a circuit for operating slow relay 65. The relay 65 in operating opens the circuit of relay 62, which, after the usual delay due to its slow release characteristic, restores. If, in the meantime, key K3 has been operated to test position, relay 62 at its armature 64 and at its resting contact now completes a circuit by way of springs 77, and K3, springs controlled by armature 69 of the pick-up relay 67, armature 130 and its resting contact, resting contact and armature 77' of relay 68, to the winding of pulse pick-up relay 67 and battery. Relay 67, upon operating, at its armature 70 closes a point in the impulse control circuit, and at its armature 69 completes a locking circuit for itself through springs 66 of K3 independent of the slow relay 62. Relays 62 and 65 interact, and each time 62 operates it transmits a ground impulse out over armature 64 and its working contact, springs 17, and armature 70 and its working contact, to the conductor 91. The first impulse transmitted to conductor 91 extends through the back contact and armature of transfer relay 104 to conductor 68' which extends to the winding of the operating magnet 109 of the vertical control switch and battery. Two branches 153 and 154 of the conductor 68' provided with clips are also connected with the vertical magnets of the switches #1 and #10 of Fig. 1, and these switches therefore are caused to take a vertical step.

The operating magnet of the vertical control switch moves the wiper 112 into connection with its first bank contact and at its interrupter contacts opens the conductor extending between this wiper and the relay 104 until the termination of the impulse at which time these contacts close to complete a circuit for the transfer relay 104. This circuit extends from the grounded wiper 111 of the sequence switch and its associated first bank contact, first contact and wiper 112 of the vertical control switch, contacts of the operating magnet 109 to the winding of relay 104 and battery. Relay 104, upon operating, transfers the impulse conductor 91 from connection with conductor 68' into connection with conductor 95. The second impulse transmitted over 91 consequently passes over conductor 95, conductor 96, back contact and armature 81 of test pick-up relay 116, armature 126 and its resting contact, armature 132 and its resting contact, to the wiper 143 of the rotary control switch. This wiper is normally standing on the first bank contact, which is commoned with all the bank contacts except the last and to which is also connected the conductor 113 and the operating magnet 144 of the rotary control switch and consequently this magnet is operated. This same ground is also applied to the rotary magnet of switch #10 by way of the conductor 113, the series relay 120 and conductor 152.

The switch #10 therefore positions its wipers on the first contact multiple in the first level. The series relay 120, upon operating, at its armature 121 locks up over branch conductor 75 of the impulse conductor 95, until the termination of the impulse, independent of relay 124, this relay operating when its circuit is closed by armature 123. Relay 120 also at its armature 122 opens a point in the operating circuit of series relay 131. At its armature 128, relay 124 completes a locking circuit for itself under control of series relay 131, at armature 127 completes a circuit for the test pick-up relay 116, at its armature 126 disconnects the circuit extending to the rotary magnet of switch #10 and closes a point in a circuit for operating the switch #1. The relay 124 also at its armature 82 closes a new path over which impulses may be transmitted. This circuit will be traced subsequently.

The third impulse transmitted over conductor 91 now passes over conductor 95, resting contact and armature 73, armature 80 and its resting contact, working contact and armature 82, armature 126 and its working contact, armature 122 and its resting contact, (relay 120 having restored at the termination of the first impulse) winding of series relay 131 to conductor 151 extending to the rotary magnet of the switch #1 and battery. The switch #1 now operates to position its wipers into connection with the first group of contacts to which it has access, and relay 131 restores relay 124 at armature 134, and at armature 133 maintains the operating circuit intact until the impulse is terminated.

Both switches are now connected with the same trunk multiple. If this multiple tests O. K., relay 78 operates over a circuit which will be traced subsequently and when the fourth impulse is transmitted out over conductors 91 and 95 the same passes by way of resting contact and armature 73, armature 80 and its working contact, resting contact and armature 82, armature 126 and its resting contact, armature 132 and its resting contact, over the previously described circuit to operate the rotary control switch and the rotary magnet of switch #10.

When, after all multiples of the level have been tested, the next impulse is transmitted over this last traced circuit, the wiper 143 of the rotary control switch will have been positioned on its last contact and the impulse, instead of operating the rotary magnet of the switch #10, and the operating magnet of the rotary control switch will pass through springs controlled by magnet 144 to the slow release relay 137. This relay operates, and as armature 140 and its working contact locks itself up through off normal springs 142. This relay also as its armature 141 unlocks the test pick-up relay 116; restores pulse pick-up relay 67 at armature 130; and at its armature 139 applies ground to conductor 108, one branch of which extends to the winding of the release magnet 145 of the rotary control switch. Another branch extends to the release magnet 110 of the vertical control switch, while two other branches are connected with the conductors 155 and 156 terminating in the release magnets of switches #1 and #10. All of these switches are accordingly restored. Another branch of conductor 108 however extends by way of the armature of relay 86 to the operating magnet 107 of the sequence switch. This magnet 107, upon operating, opens a point in conductor 115 and advances wiper 111 into second position. At the termination of the impulse, magnet 107 again closes its contacts but without effect at this time.

Shortly following the restoration of the rotary control switch, slow release relay 137 also restores, at its armature 139 removes ground from the conductor 108, and at its armature 130 again closes a point in the operating circuit of pick-up relay 67 so that this relay may reoperate and connect up impulse conductor 91 again, so that impulses are again sent over the previously described circuit to the vertical magnets of switches #1 and #10 and to the magnet 109 of the vertical control switch. These switches operate as before, except that, since the sequence switch wiper 111 is now in connection with its second bank contact, two impulses are transmitted to the vertical magnets of switches #1 and #10 and to the operating magnet 109 before transfer relay 104 can be operated to switch the impulse conductor to the rotary control switch.

Following the test of the last multiple in the second level, switches #1 and #10 and the vertical and rotary control switches are released as before, while the sequence switch is again advanced so that following the restoration of relay 137 the next three impulses will be transmitted to the vertical magnets of switches #1 and #10 and to the vertical control switch before relay 104 can operate.

When the switches have restored, after having tested the last multiple in the ninth level, which is accompanied by the advance of the sequence-switch wiper 111 into connection with its tenth contact, grounded wiper 111 completes a circuit for relay 86 when the magnet 107 restores. Relay 86 operates and transfers conductor 108 from magnet 107 to supervisory relay 88.

When the last multiple in the tenth level has been tested, the usual release pulse is transmitted over conductor 108, but this time relay 88 is operated instead of the sequence switch. This relay at its armature 89 completes a holding circuit for relay 86 independent of the sequence switch wiper 111, and at its armature 90 applies ground to the release magnet 106 of the sequence switch and to relay 101. As a result the sequence switch restores and relay 101 operates. This relay completes a locking circuit for itself at its armature 103, and at armature 105 completes a circuit for the test-complete indicating lamp L9, and at armature 102 completes a circuit for the buzzer B. The attendant, upon hearing the buzzer and observing the lighted lamp L9, restores the key K3, breaking the locking circuit of relays 101 and 67.

It will now be explained how the equipment of Fig. 1 influences the operation of the equipment of Fig. 2 when trouble is encountered.

It will be noted that the marginal relay 72 now occupies the position in the circuit formerly occupied by the buzzer B, and that the relay 78 occupies the position formerly occupied by the resistance R. The pulling up of relay 78 may be likened to the former low buzz of the buzzer, as they both indicate the same condition. Relay 72 is marginally adjusted so that it will not operate in series with relay 78. Accordingly, the pulling of relay 72 may be likened to the former loud buzz of the buzzer B. By means of circuit arrangements to be subsequently explained more in detail, the automatic testing operation is stopped anytime relay 72 pulls up; the operation is permitted to continue, only if relay 78 pulls up, when the switches are set on corresponding contact sets; and the operation is stopped if either relay 72 or relay 78 pulls up when one switch is advanced one step ahead of the other.

Assume, as in a previous instance, that when switch #10 is positioned on the first set of contacts in a level ahead of switch #1, conductor W is grounded. This causes relay 25 to operate, and, in addition to giving the visual indication of trouble, as previously described, will apply ground potential by way of its working contact and armature 19 to the winding of relay 72, by way of conductors 59' and 59. Relay 72 upon operating, at its armature 73 breaks the branch of the impulse circuit over which the next impulse would ordinarily pass thereby preventing any further operation of the equipment until a substitute path for impulses is closed, and at its armature 74 and its working contact closes a circuit for the buzzer B so that it will operate and warn the attendant that trouble has been encountered.

The attendant will now make a record of the trouble, and continue the test by operating the key K3 to the "pass up" position and by then restoring it to the "test" position. The restoration of the right-hand springs of key K3 unlocks the pulse pick-up relay 67 allowing it to restore, and as a result of the operation of the key K3 to the pass-up position an operating circuit is completed for the slow-release relay 68. This relay, upon operating, at its armatures 76 and 85 connects ground from the key K3 in pass-up position to conductor 95 and armature 126 of the relay 124 so that irrespective of the position of relays 72 or 78 or of the test pick-up relay 116, an impulse is transmitted to the switch #10 or to switch #1, depending upon the position of relay 124. The relay 68 also at its armature 77' opens a point in the operating circuit of the pulse pick-up relay 67 so as to guard against the possibility of this relay permitting a second impulse to be sent out prematurely after the attendant restores the key K3 to test position. In the present instance the impulse applied as a result of the operation of the key K3 to pass-up position is transmitted by way of armature 126 and its working contact, armature 122 and its resting contact, through the winding of low wound relay 131 to conductor 151, which terminates in the clip connecting it with the rotary magnet of the switch #1. The switch #1 therefore positions its wipers P1, P2, L1', and L2' upon its first multiple group which is the same group to which the switch #10 is connected.

We will now assume that the multiple W is open as described when explaining the operation of Fig. 1 alone. In this case the relay 14 fails to operate, causing a circuit to be completed from ground through the front contact and armature 7 of relay 5, for instance, through resting contact and armature 16 of relay 14 to conductor 51, to which is connected the branch 59' extending to conductor 59 of Fig. 2 and terminating in the marginal relay 72 and battery. Since this circuit does not include the relay 78 the marginal relay 72 operates, as hereinbefore described to complete a circuit for the buzzer B of Fig. 1, to warn the attendant that trouble has been encountered, and to open a point in the circuit used in transmitting impulses to the switches #1 and #10 to prevent their subsequent operation until the pass-up key is again operated. Had there been no trouble on the multiple just tested, no ground would have been applied to conductor 59 and therefore relay 78 would have operated and at its armature 80 completed a circuit for continuing the test, by way of resting contact and armature 82, the relay 124 having restored when the switch #1 was positioned on the multiple with the switch #10. This occurred as a result of the operation of series relay 131 removing ground from the locking circuit of 124 at its armature 134.

It will be understood that in case the attendant is operating the testing device by advancing the switches manually as first described, he will recognize that a subdued buzz from the buzzer B, when switch 10 is advanced ahead of switch 1, indicates that the bank contact sets on which the wipers are now standing are connected in multiple and will accordingly make note of it so that the first multiple can be removed from between adjacent contact sets. Similarly, in case relay 78, Fig. 2 operates when the switch #10 is advanced one step ahead of switch #1, during the mechanical operation of the switches, the cause is the same as mentioned above, and the further operation of the switches must be prevented until a note has been made of the trouble.

In order to prevent the further advance of the switches when this condition is encountered, the impulsing circuit is carried through reversing contacts on relays 78 and 124, being the contacts of armatures 80 and 82. It will be recalled that relay 124 is operated only when switch #10 is advanced one step ahead of switch #1. With relays 124 and 78 operated, the impulsing circuit extends through the resting contact and armature 73 and armature 80 and its working contact to the resting contact of armature 82, but can go no farther as the normal path for the impulsing circuit of relay 124 operated is thru armature 80 and its resting contact and the working contact and armature 82.

It will be understood of course that if adjacent bank contacts are only partially multipled together the test relays in Fig. 1 are so arranged that the marginal relay 72 is operated and relay 78 is not operated, and that in this case the impulsing circuit is opened at armature 73 instead of in the manner pointed out. It will be noted that a circuit for the buzzer B may be closed jointly by relays 78 and 124, for example, if the further operation of the switches is held up on account of the operation of relay 78. While relay 124 is operated, a circuit is completed through armature 84 and its working contact, armature 93 and its working contact, and the working contact and armature 79 to the buzzer B. On the other hand, if the further operation of the switches is held up by the failure of relay 78 to operate, with relay 124 non operated, (indicating that both switches are on the same trunk multiple), a buzzer circuit is completed through armature 84 and its working contact, armature 93 and its resting contact and the resting contact and armature 79.

The function of the test pick-up relay 116 will now be explained a little more in detail. It will be remembered that the first impulse must be delivered to the rotary magnet of switch #10 regardless of any test, as no test can be made until after the switch #10 has positioned its wipers on a set of bank contacts, accordingly the test indicating impulse contacts of armatures 73, 80, and 82, must be extended by a circuit through the resting contact and armature 81 and must include armature 126 and its resting contact so that the switch #10 can be operated through its first rotary step. Also, relay 116 at armature 84 serves to prepare a buzzer circuit so that the buzzer circuit will not need to be normally closed through armature 93 and its resting contact and the resting contact and armature 79.

As previously stated, after testing the multiples by using the #1 and #10 switches it is desirable to test the multiples between the remaining switches, for instance between #2 and #9, #3 and #8, #4 and #7 and #5 and #6 in order to pick up any reversals occurring between the banks of these switches as this trouble would not be picked up by testing the #1 and #10 switches.

Since in testing between adjacent switches no concern need be given to crosses between adjacent trunks, they having been picked up and taken care of, the testing operation may be considerably speeded up by operating the synchronizing key K5 at the bottom of Fig. 2. By operating this key the locking circuit for relay 124 is rendered ineffective and therefore the series relay 131 is connected directly to the series relay 120. It follows, that all impulses transmitted to armature 126 pass by way of conductor 113 through both relays 120 and 131 and to both rotary magnets of the switches #1 and #10 simultaneously and the switches are therefore moved from trunk multiple to trunk multiple at the same time. The testing operation takes place substantially as hereinbefore described except that, as previously stated, the tests previously made for trouble between adjacent trunks are eliminated.

What is claimed is:

1. In combination with a telephone exchange system having groups of multi-conductor multiples and automatic switches for seizing them to establish connections, testing equipment including a plurality of marginal and non marginal relays, and means including said automatic switches for simultaneously connecting each conductor of a multiple in a series circuit including a battery, one of said relays, one of said conductors and another of said relays, said relays being connected one at either end of said conductor.

2. In a device for testing for unstandard conditions of the conductors of multiples of a telephone exchange system, a plurality of marginal and non-marginal relays with means for connecting them into circuit relation with each other and with the conductors of a multiple so that if no unstandard condition exists only the non-marginal of said relays will operate, trouble indicating lamps controlled by said non-marginal relays, circuits for energizing one or more of said lamps responsive to the actuation of one or more of said relays, but effective to prevent the energization of any lamp if all said relays operate.

3. In a telephone system, groups of trunk multiples, automatic switches having access in common to said multiples, testing equipment, means including said automatic switches for causing said testing equipment to be connected with a multiple first by only one of said switches to test for an unstandard condition and subsequently by both of said switches and for causing these switches to be operated alternately until all multiples of a group have been tested, and means responsive to the completion of the testing of all of the multiples of the group for then causing the switches to be restored and reoperated to test multiples in a second group.

4. In combination with a telephone exchange system having multi-conductor multiples and automatic switches for seizing them to establish connections, testing equipment including a plurality of marginal and non-marginal relays, and means for operating said automatic switches to connect one of each of said relays to each conductor of a multiple, said relays being connected by said switches one at either end of a conductor and being connected to all conductors of the multiple simultaneously.

5. In a device for detecting unstandard conditions in the multiple of a telephone exchange system, testing equipment and means for connecting it with the multiple, an audible signal, and means for operating said signal to give one distinctive tone when one condition is found and to give a different distinctive tone when a different condition is found.

6. In an arrangement for testing a pair of parallel conductors for "short circuits", "open circuits", and "reversals", means for connecting testing devices, including a battery, to the ends of said conductors to cause a flow of current over both conductors in the same direction, said testing devices so connected that a short circuit or reversal between said conductors causes current to continue to flow in the same direction over portions of each conductor.

7. An arrangement for testing the continuity of a plurality of parallel conductors, testing devices including a source of current and a resistance element connected to said conductors, said devices so connected that a flow of current is present in both of said conductors in the same direction when no unstandard condition of or between said conductors exists, said devices so connected that when a short circuit between said conductors or a reversal of said conductors is present, said resistance is short circuited and causes an increase of current flow over a portion of each conductor in the same direction as under standard conditions.

8. An arrangement for testing a pair of parallel conductors for continuity, short circuits and reversals, consisting of a high and a low resistance element connecting a battery to the corresponding ends of said conductors, respectively, a high and a low resistance element connected from ground to the opposite ends of said conductors, respectively, the high resistance ground being connected to the same conductor as the low resistance battery, the presence of a short circuit or reversal between said conductors causing each low resistance element to be shunted around one of the high resistance elements to increase the flow of current over the conductors.

In witness whereof, I hereunto subscribe my name this 16th day of July, A. D. 1926.
JOHN I. BELLAMY.

In witness whereof, I hereunto subscribe my name this 16th day of July, A. D. 1926.
RODNEY G. RICHARDSON.